United States Patent
Chaiken et al.

(10) Patent No.: US 7,366,923 B2
(45) Date of Patent: Apr. 29, 2008

(54) METHOD AND SYSTEM FOR DETERMINING IF AN INFORMATION HANDLING SYSTEM IS OPERATING WITHIN A CARRYING CASE

(75) Inventors: Craig Chaiken, Pflugerville, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 11/101,845

(22) Filed: Apr. 8, 2005

(65) Prior Publication Data

US 2006/0230294 A1  Oct. 12, 2006

(51) Int. Cl.
G06F 1/00 (2006.01)
G06F 1/26 (2006.01)
(52) U.S. Cl. .................. 713/300; 713/320; 713/321
(58) Field of Classification Search .......... 713/300, 713/320, 321; 714/24; 307/112
See application file for complete search history.

(56) References Cited

U.S. PATENT DOCUMENTS

| 5,230,055 | A | * | 7/1993 | Katz et al. | 713/300 |
| 5,303,171 | A | * | 4/1994 | Belt et al. | 713/321 |
| 5,635,798 | A | * | 6/1997 | Ogura et al. | 315/39.71 |
| 5,926,404 | A | * | 7/1999 | Zeller et al. | 713/321 |
| 2004/0103345 | A1 | * | 5/2004 | Dunstan | 714/24 |
| 2004/0227407 | A1 | * | 11/2004 | Nagai | 307/112 |

* cited by examiner

*Primary Examiner*—Suresh K Suryawanshi
(74) *Attorney, Agent, or Firm*—Haynes & Boone, LLP

(57) ABSTRACT

A portable information handling system (IHS) is provided. The portable IHS includes a processor and a memory device coupled to the processor. The memory device is for storing instructions processable by the processor for determining whether a lid of the portable IHS is closed. Also, the instructions are processable by the processor for, in response to determining that the lid of the portable IHS is closed, determining whether the portable IHS is operating within a substantially sealed case. Moreover, the instructions are processable by the processor for, in response to determining that the portable IHS is operating within a substantially sealed case, reducing the portable IHS power consumption.

18 Claims, 6 Drawing Sheets

1

METHOD AND SYSTEM FOR DETERMINING IF AN INFORMATION HANDLING SYSTEM IS OPERATING WITHIN A CARRYING CASE

BACKGROUND

The description herein relates generally to information handling systems (IHSs) and more particularly to a portable IHS that detects whether it is operating within a case.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A portable IHS is an example of an IHS. Examples of a portable IHS include a notebook or a laptop computer, and other IHSs that are capable of operating portably with power supplied from a battery. For transporting a portable IHS, a user typically places the portable IHS in a reduced power state (e.g., a standby state or a hibernation state) or powers down the portable IHS, closes the portable IHS' lid, and places the portable IHS in a case (e.g., a substantially sealed case such as a conventional carrying case). In some situations, the user may not wait until the portable IHS has completed entering a reduced power state or completed powering down before closing the portable IHS' lid, assuming that the portable IHS will eventually complete such processes. However, even after the user has closed the lid and placed the portable IHS in a case, the portable IHS may not complete the processes to enter a reduced power state or power down. Accordingly, the portable IHS may continue to operate (e.g., in a full power state) while it is inside a case.

The portable IHS operating while it is inside a case may cause various problems. For example, temperature of the portable IHS may increase. Such increase in temperature may increase activity of the portable IHS' cooling fan, further leading to increase power consumption (e.g., consumption of power from the portable IHS's battery).

What is needed is a portable IHS for detecting whether the portable IHS is operating within a case, without the disadvantages discussed above.

SUMMARY

Accordingly, several embodiments of a portable information handling system (IHS) are disclosed. A method includes determining whether a lid of the portable IHS is closed. The method also includes, in response to determining that the lid is closed, determining whether the portable IHS is operating within a substantially sealed case. The method further includes, in response to determining that the portable IHS is operating within a substantially sealed case, reducing the portable IHS power consumption.

DETAILED DESCRIPTION

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
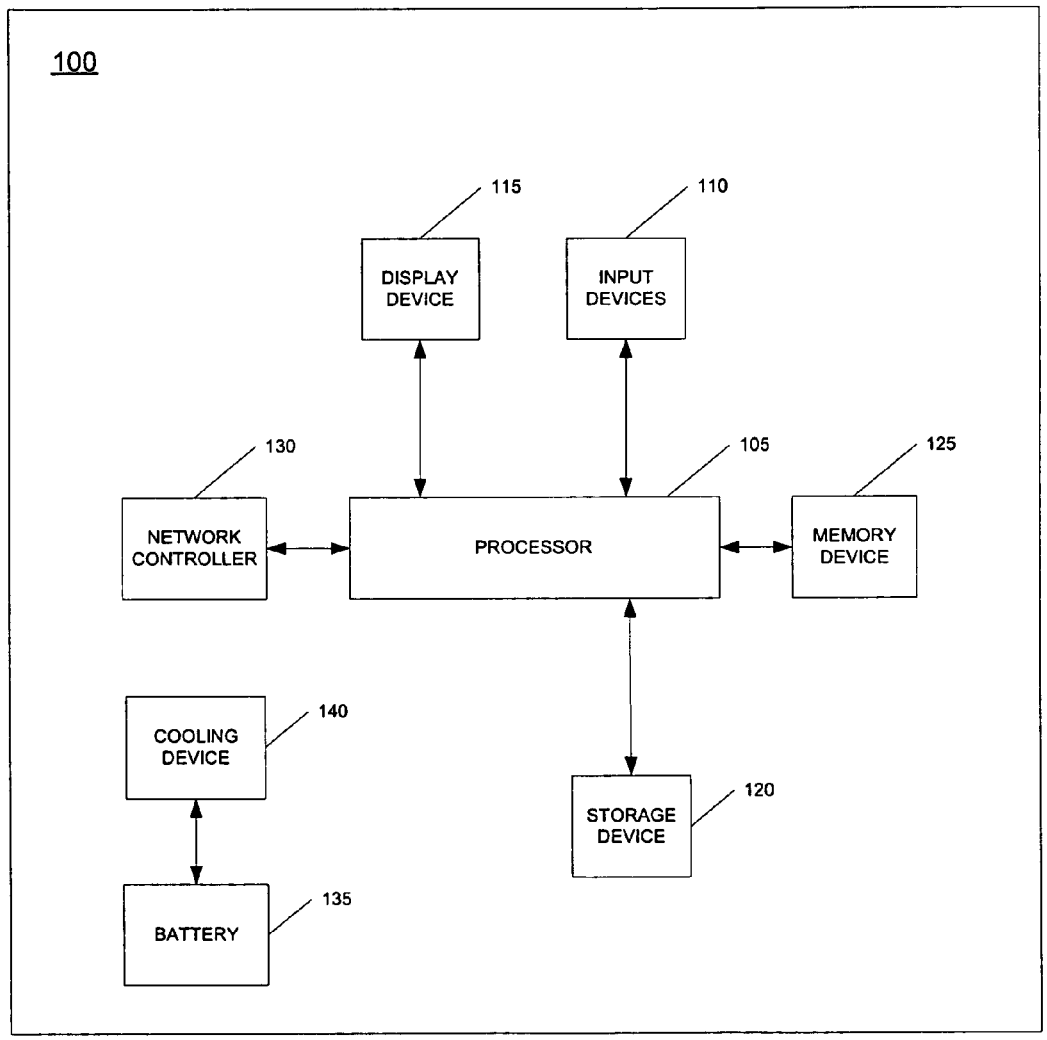
FIG. 1 is a block diagram of a portable information handling system (IHS) according to an illustrative embodiment.

FIG. 1 is a block diagram of an IHS, indicated generally at 100, according to the illustrative embodiment. The IHS 100 includes a processor 105 (e.g., an Intel Pentium series processor) for executing and otherwise processing instructions, input devices 110 for receiving information from a human user, a display device 115 (e.g., a cathode ray tube (CRT) device, a projector, a liquid crystal display (LCD) device, or a plasma display device) for displaying information to the user, a storage device 120 (e.g., a non-volatile storage device such as a hard disk drive or other computer readable medium or apparatus) for storing information, a memory device 125 (e.g., random access memory (RAM) device and read only memory (ROM) device), also for storing information, and a network controller 130 for communicating between the IHS 100 and a network. Each of the input devices 110, the display device 115, the storage device 120, the memory device 125, and the network controller 130 is coupled to the processor 105, and to one another. In one example, the IHS 100 includes various other electronic circuitry for performing other operations of the IHS 100, such as a print device (e.g., a ink-jet printer or a laser printer) for printing visual images on paper.

The input devices 110 include, for example, a conventional keyboard and a pointing device (e.g., a "mouse", a roller ball, or a light pen). A user operates the keyboard to input alphanumeric text information to the processor 105, and the processor receives such information from the keyboard. A user also operates the pointing device to input cursor-control information to the processor 105, and the processor 105 receives such cursor-control information from the pointing device.

In the illustrative embodiment, the IHS 100 is a portable IHS. Accordingly, the IHS 100 includes a battery 135 for supplying power to the various electronic circuitry and devices of IHS 100 discussed above. Although not shown for clarity, the battery 135 is coupled to such circuitry and devices (e.g., via power rail). Such battery is also coupled to and supplies power to a cooling device (e.g., a cooling fan) 140, which cools (i.e., reduces temperature of) the various circuitry and devices of the IHS 100.

Figure 2:
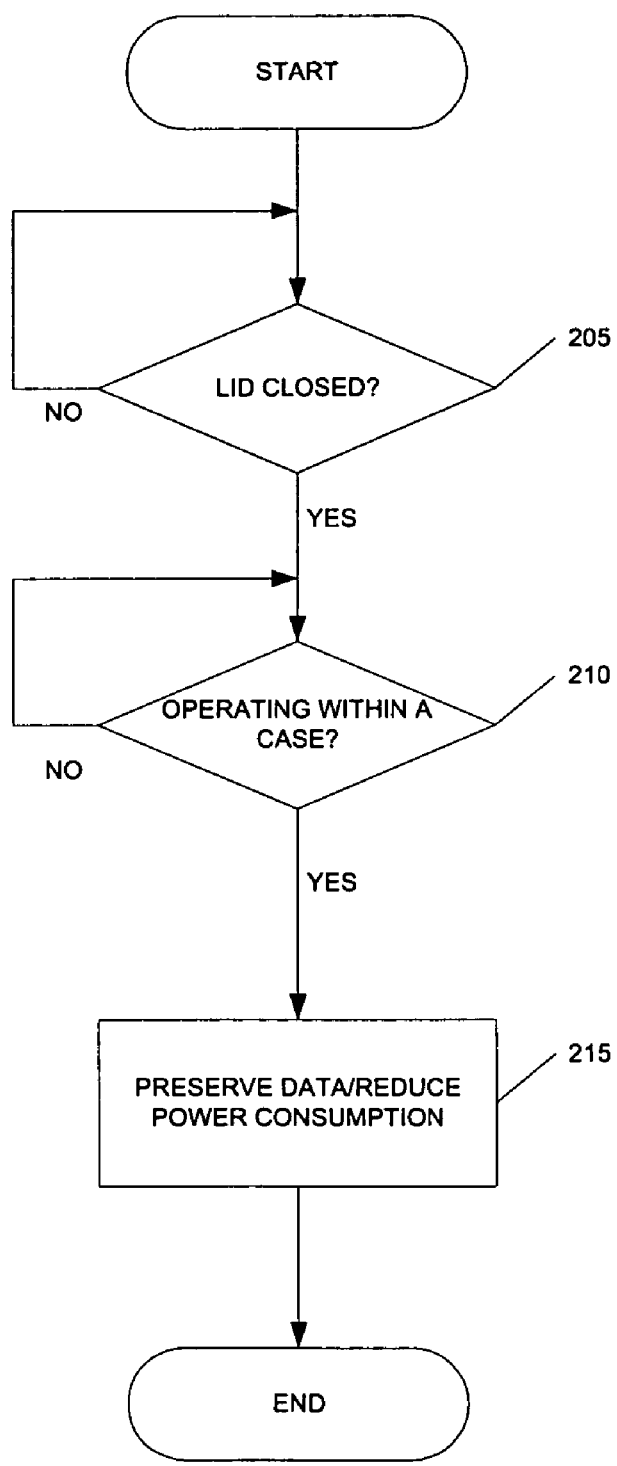
FIG. 2 is a flow chart of operations performed by the portable IHS of FIG. 1.

FIG. 2 is a flow chart of operations performed by the portable IHS 100. The portable IHS 100 performs such operations by executing and otherwise processing one or more instructions stored in the memory device 125. More particularly, the processor 105 of the IHS 100 executes or otherwise processes such instructions.

The operations begin at a step 205, where the portable IHS 100 self-loops until it has determined that its lid is closed. The lid being closed is an indication that the portable IHS 100 is potentially operating within a case. Accordingly, in response to the portable IHS 100 determining that the lid is closed, the operations continue to a step 210.

At the step 210, the portable IHS 100 self loops until it has determined that it is operating within a case (e.g., a substantially sealed case such as a conventional carrying case). The portable IHS 100 makes the determination by performing the operations discussed in more detail below in connection with FIGS. 3, 5 and 6. If the portable IHS 100 determines that it is operating within a case, the operations continue to a step 215.

As discussed above, the portable IHS 100 operating inside a case may increase the cooling fan 140's activity, and thereby cause portable IHS 100 to increase its power consumption. If the portable IHS 100 continues to operate inside a case in such manner for a sufficient amount of time, the portable IHS 100 is capable of exhausting the battery 135's capacity. Accordingly, at the step 215, the portable IHS 100 preserves its data (e.g., transient data stored in the IHS 100's cache memory device) and reduces its power consumption as discussed below in more detail (in connection with FIG. 4). After the step 215, the operations end.

Figure 3:
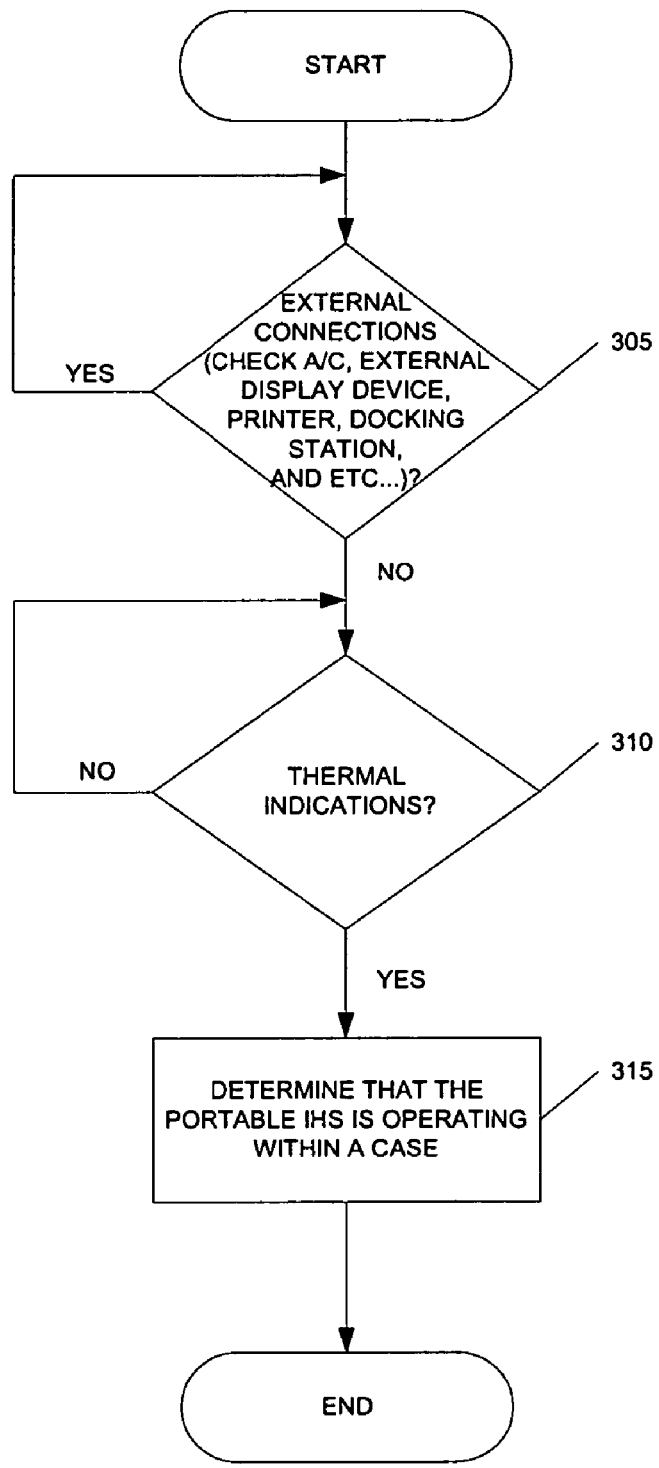
FIG. 3 is a flow chart of operations performed by the portable IHS at a step of FIG. 2.

FIG. 3 is a flow chart of operations performed by the portable IHS 100 at the step 210 of FIG. 2. The operations begin at a step 305, where the portable IHS 100 self loops until it has determined that there are no external connections. For example, the portable IHS 100 determines (e.g., by polling) whether it is coupled to an external power source (e.g., an alternating current ("AC") source). Similarly, the IHS 100 determines whether it is coupled to an external device (e.g., a docking station, an external display device, and/or a printer).

Notably, the IHS 100 determining that there is an external connection is an indication of a substantial likelihood that the portable IHS 100 is not in a case. For example, it is unlikely that the IHS 100 would be placed in a carrying case while it is still coupled to an external display device. By comparison, the IHS 100 determining that there are no external connections is an indication that the portable IHS is potentially operating within a case. Accordingly, in response to the portable IHS 100 determining that there are no external connections, the operations continue to a step 310.

At the step 310, the portable IHS 100 self loops until it has determined that its thermal conditions indicate that it is operating within a case. Operations performed by the portable IHS 100 in making such determination is discussed in more detail below in connection with FIGS. 5 and 6. After the step 310, the operations continue to a step 315.

At the step 315, the portable IHS 100 determines that it is operating within a case. After the step 315, the operations (i.e., the operations of the step 210) end as shown.

Figure 4:
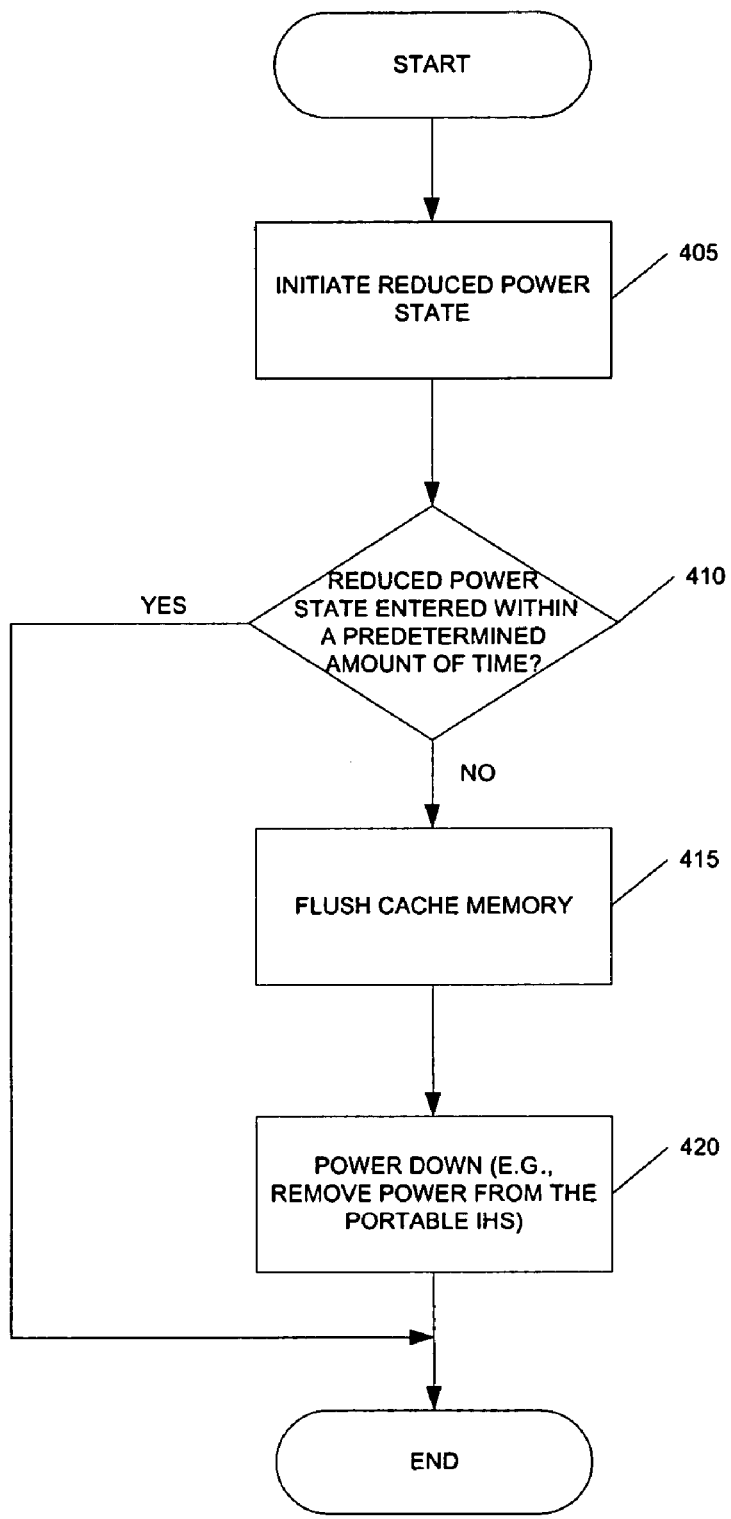
FIG. 4 is a flow chart of operations performed by the portable IHS at another step of FIG. 2.

FIG. 4 is a flow chart of operations performed by the portable IHS 100 at the step 215 of FIG. 2. The operations begin at a step 405, where the portable IHS 100 initiates a process to enter a "hibernation" state or another reduced power state (e.g., a "sleep" or a "suspend" state) that preserves the portable IHS 100's data stored in memory. After the step 405, the operations continue to a step 410.

At the step 410, the portable IHS 100 determines whether it has completed the process to enter the hibernation state within a previously determined amount of time. In one example such amount of time is approximately equal to the amount of time conventionally taken by the portable IHS 100 to complete the process of entering a hibernation state. If the portable IHS 100 determines that it completed the process to enter the hibernation state, the operations end as shown. Otherwise, the operations continue to a step 415.

At the step 415, the portable IHS 100 writes (e.g., "flushes") data stored in its memory device (e.g., a cache memory device) to its storage device (e.g., a hard disk), so that such data is preserved. After the step 415, the operations continue to a step 420.

At the step 420, the portable IHS 100 powers down. In one example, the portable IHS 100 powers down by removing power (e.g., power supplied by the battery 140) from itself. After the step 420, the operations end.

Figure 5:
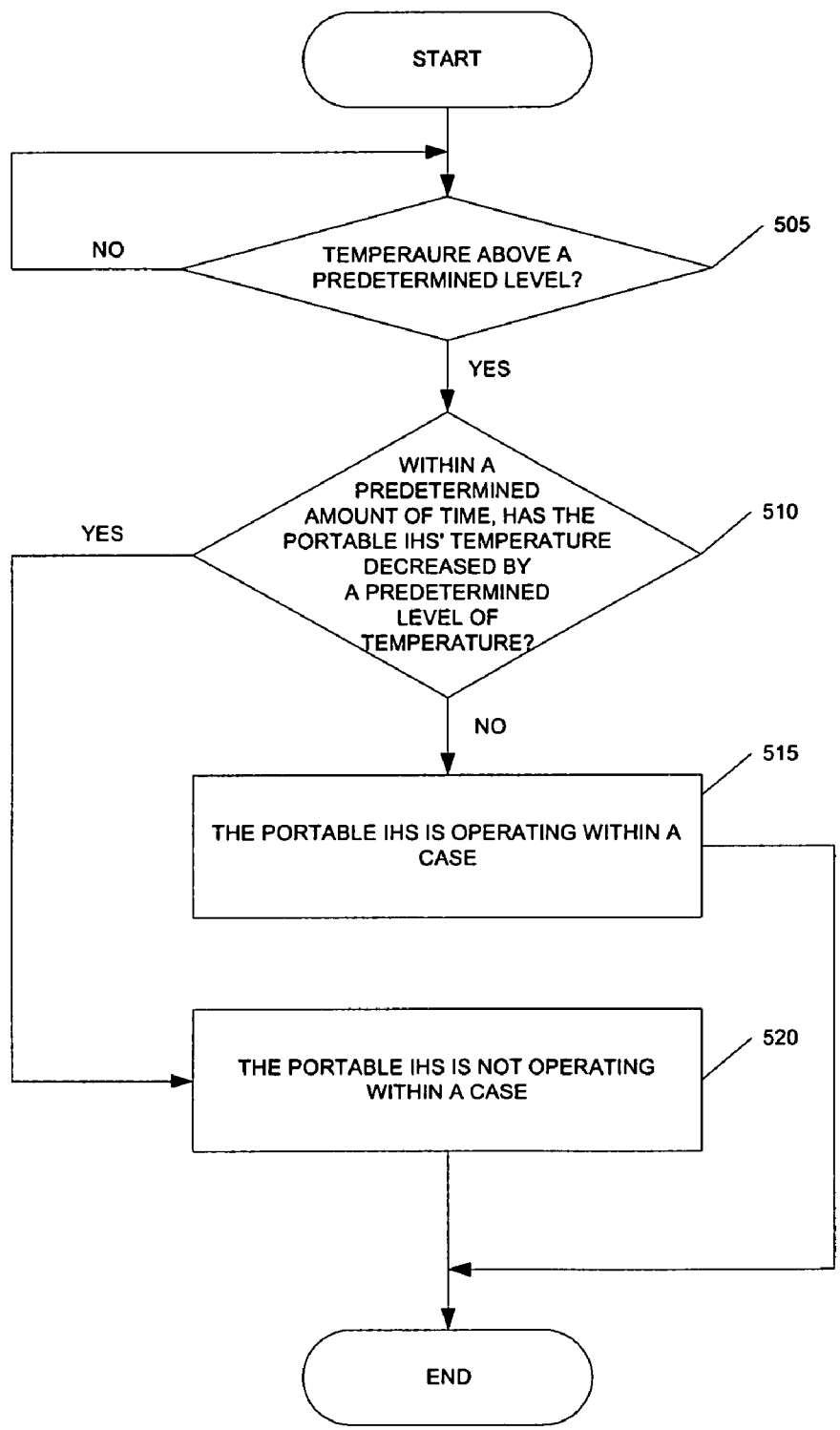
FIG. 5 is a flow chart of operations performed by the portable IHS at a step of FIG. 3, according to one embodiment.

FIG. 5 is a flow chart of operations performed by the portable IHS 100 at the step 310 of FIG. 3, according to one embodiment. The operations begin at a step 505, where the portable IHS 100 self loops until it has determined that its temperature level is above a predetermined level (indicating a possibility that the cooling fan 140 is not operating efficiently because the portable IHS 100 is operating within a case). If the portable IHS 100 determines as such, the operations continue to a step 510.

At the step 510, the portable IHS 100 determines whether, within a predetermined amount of time, the portable IHS 100's temperature has decreased by at least a predetermined level of temperature. The predetermined amount of time and the predetermined level of temperature are interrelated such that, predetermined level of temperature is substantially a level of temperature typically reduced by the cooling fan 140 within the predetermined amount of time, if the portable IHS 100 were not operating within a case. In this way, the IHS 100 determines the cooling fan 140's effectiveness in reducing the IHS 100's temperature. If the portable IHS 100 determines negatively at this step, the operations continue to a step 515.

At the step 515, the portable IHS 100 determines that it is operating within a case because the cooling fan 140's effectiveness has been reduced. After the step 515, the operations end.

Referring again to the step 510, if the portable IHS 100 determines affirmatively at the step 510, the operations continue to a step 520. At the step 520, the portable IHS 100 determines that it is not operating within a case because the cooling fan 140's effectiveness has not been compromised. After the step 520, the operations end.

Figure 6:
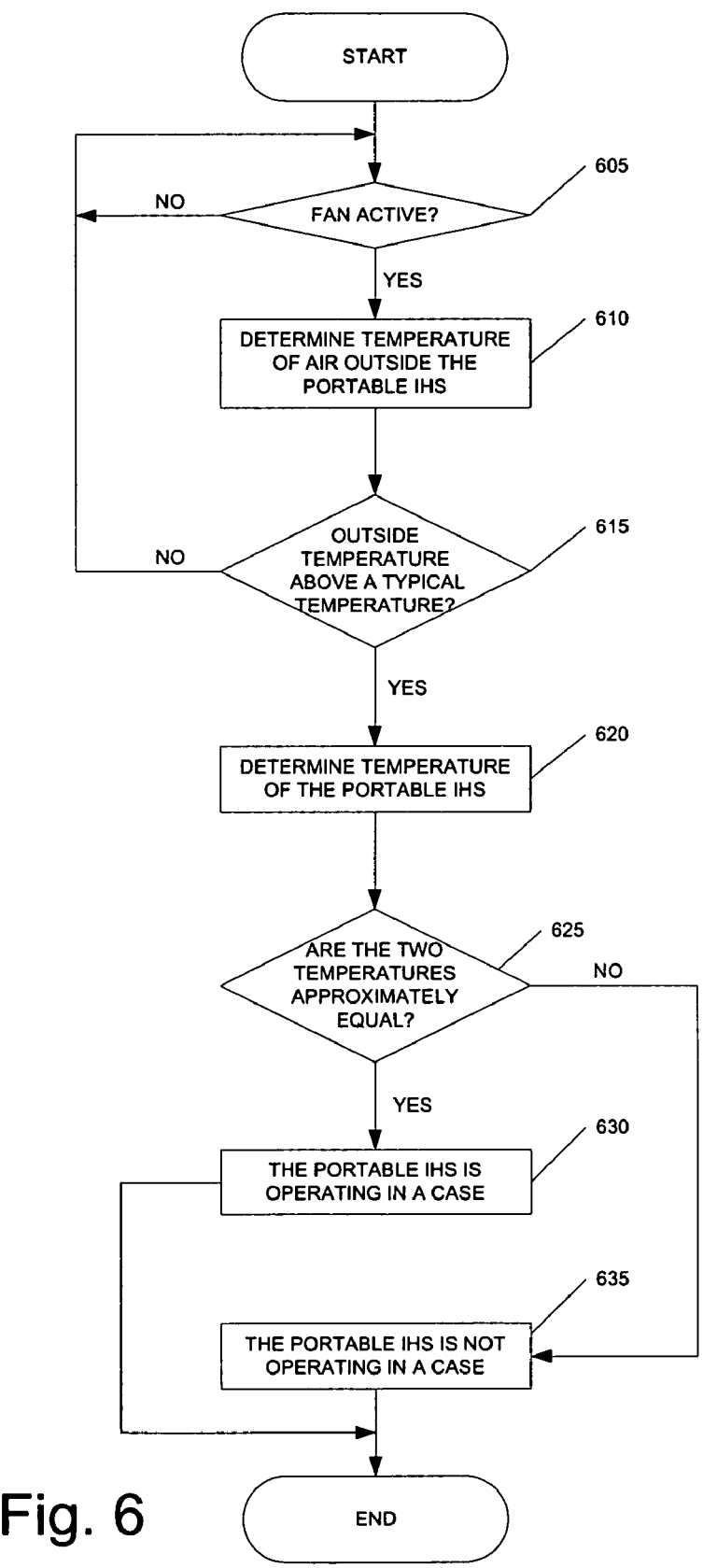
FIG. 6 is a flow chart of operations performed by the portable IHS at the step of FIG. 3, according to another embodiment.

FIG. 6 is a flow chart of operations performed by the portable IHS 100 at the step 310 of FIG. 3, according to another embodiment. The operations begin at a step 605, where the IHS 100 self-loops until it has determined that its fan is active. If the IHS 100 determines that the fan is active, the operations continue to a step 610.

At the step 610, the portable IHS 100 determines a temperature value of air (i.e., ambient air) outside the portable IHS 100. The portable IHS 100 determines such value by measuring the temperature of air that is absorbed by the cooling fan 140. After the step 610, the operations continue to a step 615.

At the step 615, the portable IHS 100 determines whether the temperature value determined at the step 610 is above a predetermined value. If so, the operations continue to a step 620. Otherwise, the operations return to the step 605. In one example, the predetermined value is approximately equal to a typical temperature value of ambient air.

At the step 620, the portable IHS 100 determines a temperature value of the portable IHS 100. For example, such value is measurable by measuring the temperature of one or more devices (e.g., the devices depicted in FIG. 1) or electronic circuitry of the portable IHS 100. Also, such value is measurable by measuring the temperature of air inside the portable IHS 100. After the step 620, the operations continue to a step 625.

At the step 625, the portable IHS 100 determines whether the temperature value of air outside the portable IHS 100 and the temperature value of the portable IHS 100 are approximately equal to one another. If so, the operations continue to a step 630.

At the step 630, the portable IHS 100 determines that it is operating within a case. The portable IHS 100 determines as such because temperature value of air outside the portable IHS 100 and the temperature value of the portable IHS 100 itself, would approximately equal one another as the portable IHS 100 continues to operate within a substantially sealed environment. After the step 630, the operations end.

Referring again to the step 625, if the portable IHS 100 determines that the two temperature values are not approximately equal to one another, the operations continue to a step 635. At the step 635, the portable IHS 100 determines that it is not operating within a case. After the step 635, the operations end as shown.

In one example, the portable IHS 100 repeatedly performs the operations of FIG. 6 (e.g., as indicated by the self looping step 310) for a predetermined period of time to more accurately account for a potential delay before temperature values of air outside the portable IHS 100 and the portable IHS 100 are approximately equal to one another. Accordingly, the predetermined period of time is associated with such potential delay.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method performed by a portable information handling system (IHS), the method comprising:
   determining whether a lid of the portable IHS is closed;
   in response to determining that the lid is closed, determining whether the portable IHS is operating within a substantially sealed case; and
   in response to determining that the portable IHS is operating within a substantially sealed case, reducing the portable IHS power consumption, wherein determining whether the portable IHS is operating within a substantially sealed case includes:
   determining whether a temperature value of air outside the portable IHS is approximately equal to a temperature value of the portable IHS.

2. The method of claim 1, wherein the case is a carrying case.

3. The method of claim 1, and comprising:
   in response to determining that the portable IHS is operating within a substantially sealed case, preserving data.

4. The method of claim 3, wherein the data is stored in a cache memory device.

5. The method of claim 4, and comprising:
   writing the data in the cache memory device to a storage device.

6. The method of claim 1, wherein determining whether the portable IHS is operating within a substantially sealed case includes:
   determining whether the portable IHS has external connections.

7. The method of claim 1, wherein determining whether the portable IHS is operating within a substantially sealed case includes:
   determining whether, within a predetermined amount of time, the portable IHS temperature has decreased by a previously determined level of temperature.

8. The method of claim 1, wherein reducing the portable IHS power consumption includes:
   entering a reduced power state.

9. The method of claim 1, wherein reducing the portable IHS power consumption includes:
   removing power supplied to the portable IHS.

10. A portable information handling system IHS comprising:
    a processor; and
    a memory device, coupled to the processor, for storing instructions processable by the processor for:
    determining whether a lid of the portable IHS is closed;
    in response to determining that the lid is closed, determining whether the portable IHS is operating within a substantially sealed case; and
    in response to determining that the portable IHS is operating within a substantially sealed case, reducing the portable IHS power consumption, wherein determining whether the portable IHS is operating within a substantially sealed case includes:
    determining whether a temperature value of air outside the portable IHS is approximately equal to a temperature value of the portable IHS.

11. The portable IHS of claim 10, wherein the case is a carrying case.

12. The portable IHS of claim 10, wherein the memory device is for storing instruction processable by the processor for:

in response to determining that the portable IHS is operating within a substantially sealed case, preserving data.

13. The portable IHS of claim 12, wherein the data is stored in a cache memory device.

14. The portable IHS of claim 13, wherein the memory device is for storing instruction processable by the processor for:
writing the data in the cache memory device to a storage device.

15. The portable IHS of claim 10, wherein determining whether the portable IHS is operating within a substantially sealed case includes:
determining whether the portable IHS has external connections.

16. The portable IHS of claim 10, wherein determining whether the portable IHS is operating within a substantially sealed case includes:
determining whether, within a predetermined amount of time, the portable IHS temperature has decreased by a previously determined level of temperature.

17. The portable IHS of claim 10, wherein reducing the portable IHS power consumption includes:
entering a reduced power state.

18. The portable IHS of claim 10, wherein reducing the portable IHS power consumption includes:
removing power supplied to the portable IHS.

* * * * *

UNITED STATES PATENT AND TRADEMARK OFFICE
CERTIFICATE OF CORRECTION

PATENT NO. : 7,366,923 B2 Page 1 of 1
APPLICATION NO. : 11/101845
DATED : April 29, 2008
INVENTOR(S) : Craig Chaiken et al.

It is certified that error appears in the above-identified patent and that said Letters Patent is hereby corrected as shown below:

Claim 10, Column 6, Line 45, delete "IHS" and insert --(IHS)--.

Signed and Sealed this

Sixteenth Day of December, 2008

JON W. DUDAS
*Director of the United States Patent and Trademark Office*